US 6,549,319 B2

(12) United States Patent
Mahlab

(10) Patent No.: US 6,549,319 B2
(45) Date of Patent: Apr. 15, 2003

(54) APPARATUS FOR OPTICAL WAVELENGTH CONVERSION

(75) Inventor: Uri Mahlab, Yehuda (IL)

(73) Assignee: Axonlink (BVI) Corporation, Tortola (VI)

( * ) Notice: Subject to any disclaimer, the term of this patent is extended or adjusted under 35 U.S.C. 154(b) by 2 days.

(21) Appl. No.: 09/967,980

(22) Filed: Oct. 2, 2001

(65) Prior Publication Data

US 2002/0041422 A1 Apr. 11, 2002

(30) Foreign Application Priority Data

Oct. 5, 2000 (IL) .................................................. 138866

(51) Int. Cl.[7] .............................. G02F 1/01; H04B 10/02
(52) U.S. Cl. ....................................... 359/238; 359/331
(58) Field of Search ................................. 359/331, 332, 359/238, 240, 241, 322, 323, 180, 182, 326, 135, 139, 124, 128, 127, 278, 276

(56) References Cited

U.S. PATENT DOCUMENTS 5,654,814 A * 8/1997 Ouchi et al. ................. 359/156
5,680,235 A * 10/1997 Johansson .................... 359/110
5,754,322 A * 5/1998 Ishikawa et al. ............. 359/135
5,949,573 A 9/1999 Glance ........................ 359/326

* cited by examiner

*Primary Examiner*—Georgia Epps
*Assistant Examiner*—Omar Hindi
(74) *Attorney, Agent, or Firm*—Browdy and Neimark, P.L.L.C.

(57) ABSTRACT

An optical wavelength converting apparatus for use with a light source providing a light beam having a wavelength $\lambda$, the apparatus comprises an optical wavelength conversion module and a wavelength controller. The optical wavelength conversion module comprises at least two optical modulators each capable of being coupled to the light source and respectively capable of modulating the light beam to a first modulated light beam including a pair of channel having wavelengths $\lambda \pm \Delta \lambda_i$, and a second modulated light beam including a pair of channels having wavelengths $\lambda \pm \Delta \lambda_j$ where $\Delta \lambda_i \neq \Delta \lambda_j$. The wavelength controller is adapted for switching the light beam to one of said at least two optical modulators for modulation to one of said modulated light beams having a pair of channels with wavelengths $\lambda \pm \Delta \lambda_i$ or $\lambda \pm \Delta \lambda_j$.

10 Claims, 2 Drawing Sheets

APPARATUS FOR OPTICAL WAVELENGTH CONVERSION

FIELD OF THE INVENTION

The invention is in the field of optical wavelength converters.

BACKGROUND OF THE INVENTION

In U.S. Pat. No. 5,949,573 to Glance, there is illustrated and described a tunable optical wavelength converter for generating a selectable wavelength for an optical signal. The tunable wavelength converter includes an input active section, an output active section, an interferometer and an optical wavelength selector all integrated onto a substrate between two mirrors. An optical input signal at a first wavelength is input through the input active section which in conjunction with the output section and the interferometer controls the amplitude of an optical signal at a second wavelength propagating in the laser cavity. The information contained in the amplitude of the input signal is transferred to the optical signal in the interferomic laser cavity and output by the output active section. Thus, the information of the optical input signal at the first wavelength is transferred to the optical output signal at the second wavelength.

SUMMARY OF THE INVENTION

In accordance with the present invention, there is provided an optical wavelength converting apparatus for use with a light source providing a light beam having a wavelength $\lambda$, the apparatus comprising:

(a) an optical wavelength conversion module including at least two optical modulators each capable of being coupled to the light source, and respectively capable of modulating the light beam to a first modulated light beam including a pair of channels having wavelengths $\lambda \pm \Delta\lambda_i$, and a second modulated light beam including a pair of channels having wavelengths $\lambda \pm \Delta\lambda_j$ where $\Delta\lambda_i \neq \Delta\lambda_j$; and (b) a wavelength controller for switching the light beam to one of said at least two optical modulators for modulating to one of said modulated light beams having a pair of channels with wavelengths $\lambda \pm \Delta\lambda_i$ or $\lambda \pm \Delta\lambda_j$.

The optical wavelength converting apparatus of the present invention provides highly convenient wavelength conversion from a wavelength $\lambda$ to a modulated wavelength $\lambda \pm \Delta\lambda$. The optical modulators of the optical wavelength conversion module are preferably fine tuned by tunable radio frequency (RF) signal generators in accordance with performance monitoring requirements. The optical wavelength converting apparatus of the present invention is particularly suitable for deployment in optical routers for optical packet switching purposes in different networks including inter alia access networks, metropolitan ring networks, and long haul networks.

BRIEF DESCRIPTION OF THE DRAWINGS

In order to understand the invention and to see how it can be carried out in practice, a preferred embodiment will now be described, by way of a non-limiting example only, with reference to the accompanying drawings in which the same parts are likewise numbered, and in which.

DETAILED DESCRIPTION OF THE DRAWINGS

Figure 1:
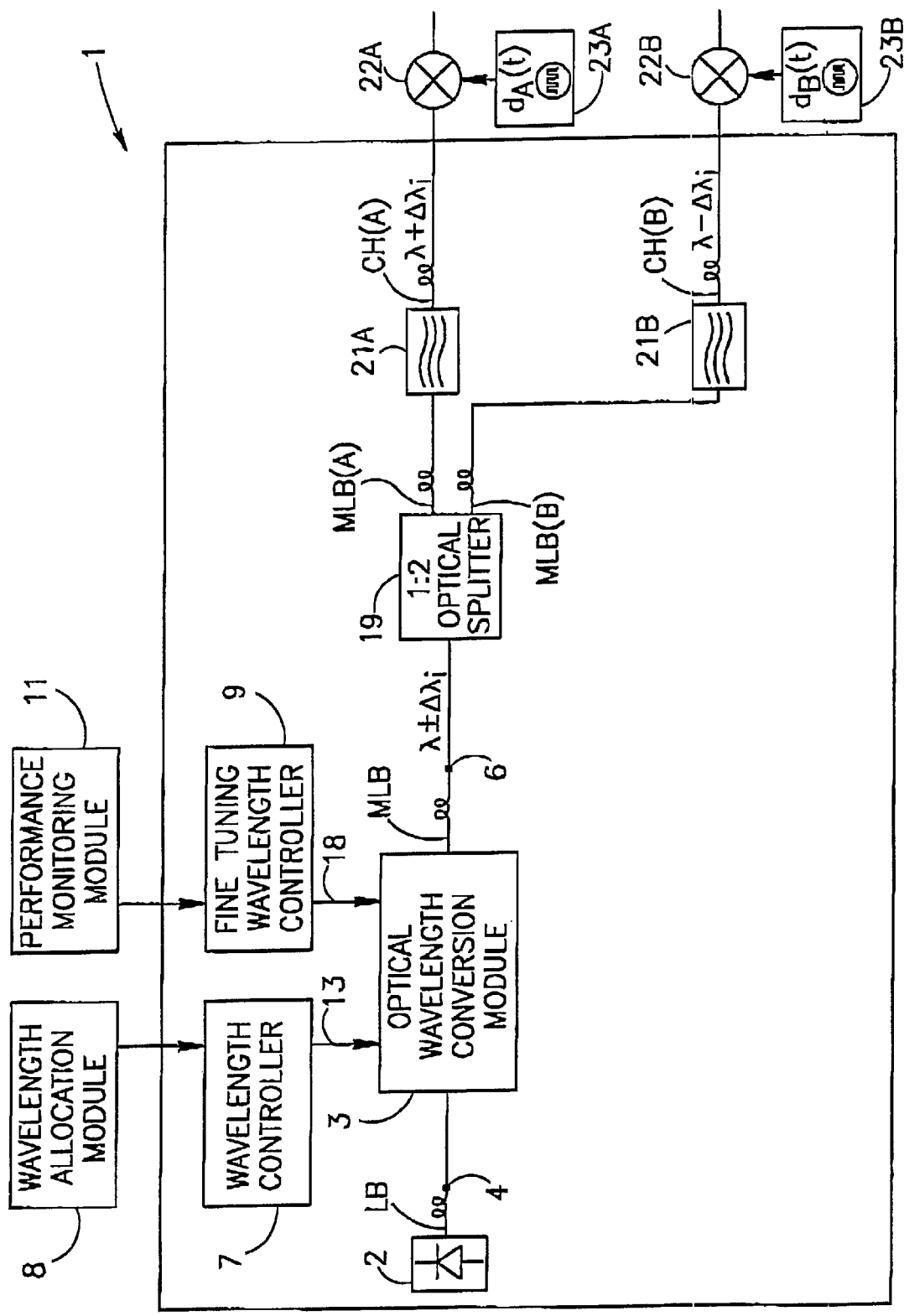
FIG. 1 is a schematic representation of an optical wavelength converting apparatus constructed and operative in accordance with the present invention.

FIG. 1 shows an optical wavelength converting apparatus 1 for use with a laser 2 (constituting a light source) emitting a light beam LB having a wavelength $\lambda$. The optical wavelength converter 1 includes an optical wavelength conversion module 3 having an input terminal 4 for coupling to the laser 2, and at an output terminal 6 at which a modulated light beam MLB including a pair of channels having wavelengths $\lambda \pm \Delta\lambda_i$ is available. The optical wavelength conversion module 3 is under the control of a wavelength controller 7 in turn under the control of a wavelength allocation module 8, and a fine tuning wavelength controller 9 in turn under the control of a performance monitoring module 11.

Figure 2:
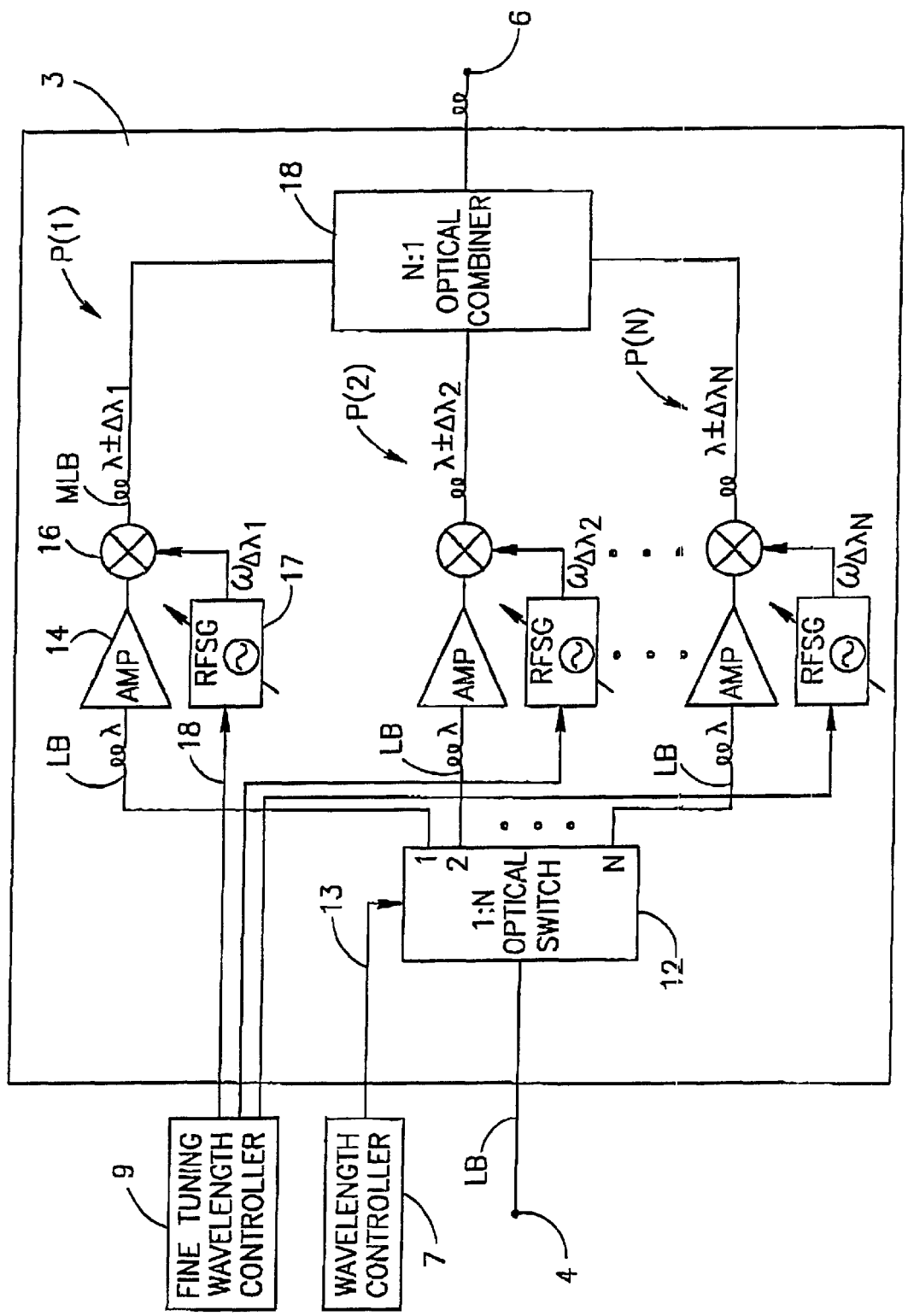
FIG. 2 is a schematic representation of an optical wavelength conversion module of the optical wavelength converting apparatus of FIG. 1.

FIG. 2 shows that the optical wavelength conversion module 3 includes in a cascaded arrangement: an 1:N optical switch 12 under the control of the wavelength controller 7 via a control line 13, two or more optical paths P(1), P(2), . . . P(N) each including an optical amplifier 14 and an optical modulator 16 driven by a radio frequency (RF) signal generator 17, and an N:1 optical combiner 18. Each optical modulator 16 is preferably of the external modulator type, for example, a resonator, a crystal modulator, an electro-absorption modulator, and the like. Each RF signal generator 17 modulates the wavelength $\lambda$ to a different $\lambda \pm \Delta\lambda$, and is under the control of the fine tuning wavelength controller 9 via a control line 18 for fine tuning purposes.

Depending on the intended deployment of the optical wavelength converter 1, it can further include an 1:2 optical splitter 19 deployed after the output terminal 6 for splitting the modulated light beam MLB into two modulated light beams MLB(A), and MLB(B) each including a pair of channels having wavelengths $\lambda \pm \Delta\lambda_i$. Also, the two modulated light beams MLB(A) and MLB(B) can be filtered by narrowband filters 21A and 21B for respectively passing a channel CH(A) having a wavelength $\lambda \pm \Delta\lambda_i$, and a channel CH(B) having a wavelength $\lambda - \Delta\lambda_i$, and one or both of the channels CH(A) and CH(B) can be modulated by an optical modulator 22 with information from an information source 23.

The use of the optical wavelength converter 1 is as follows:

The wavelength allocation module 8 instructs the wavelength controller 7 to switch the 1:N optical switch 12 to couple one of the optical paths P(1), P(2), . . . P(N) to the laser 2 to provide a modulated light beam MLB having a pair of channels of a predetermined wavelength $\lambda \pm \Delta\lambda$ at the output terminal 6. Depending on performance monitoring criteria, the performance monitoring module 11 can instruct the fine tuning wavelength controller 9 to fine tune the respective RF signal generator 17 of the operative optical path.

While the invention has been described with respect to a limited number of embodiments, it will be appreciated that many variations, modifications, and other applications of the invention can be made within the scope of the appended claims. In particular, the optical wavelength converter can be implemented with alternative switching arrangements than the exemplary implementation of the 1:N optical switch and the N:1 optical combiner.

What is claimed is:

1. An optical wavelength converting apparatus for use with a light source providing a light beam having a wavelength $\lambda$, the apparatus comprising:

(a) an optical wavelength conversion module including at least two optical modulators each capable of being coupled to the light source and respectively capable of modulating the light beam to a first modulated light beam including a pair of channels having wavelengths $\lambda \pm \Delta\lambda_i$, and a second modulated light beam including a pair of channels having wavelengths $\lambda \pm \Delta\lambda_j$ where $\Delta\lambda_i \neq \Delta\lambda_j$; and (b) a wavelength controller for switching the light beam to one of said at least two optical modulators for modulation to one of said modulated light beams having a pair of channels with wavelengths $\lambda \pm \Delta\lambda_i$ or $\lambda \pm \Delta\lambda_j$.

2. The apparatus according to claim 1 wherein said optical wavelength conversion module further includes an 1:N optical switching device interdisposed between the light source and said at least two optical modulators under the control of said wavelength controller for switching the light beam to one of said at least two optical modulators.

3. The apparatus according to claim 1, wherein said optical wavelength conversion module further includes an N:1 optical combiner interdisposed between said at least two optical modulators and an output terminal at which one of said modulated light beams having a pair of channels with wavelengths $\lambda \pm \Delta\lambda_i$ or $\lambda \pm \Delta\lambda_j$ is available.

4. The apparatus according to claim 1, wherein each said optical modulator is driven by a tunable RF signal generator under the control of a fine tuning wavelength controller.

5. The apparatus according to claim 1 and further comprising an optical filter deployed after said optical wavelength conversion module for passing a single channel of said pair of channels.

6. The apparatus according to claim 5 wherein said single channel is modulated with information.

7. The apparatus according to claim 1 and further comprising an optical splitter deployed after said optical wavelength conversion module for splitting said modulated light beam into two modulated light beams each having a pair of channels with wavelengths $\lambda \pm \Delta\lambda_i$, a first optical filter deployed after said optical splitter for providing a first channel having a wavelength $\lambda \pm \Delta\lambda_i$, and a second optical filter deployed after said optical splitter for providing a second channel having a wavelength $\lambda - \Delta\lambda_i$.

8. The apparatus according to claim 7 wherein at least one channel of said first channel and said second channel is modulated with information.

9. An optical router including at least one optical wavelength converting apparatus according to claim 1.

10. An optical communication network including at least one optical wavelength converting apparatus according to claim 1.

* * * * *